US008451453B2

(12) United States Patent
Molin et al.

(10) Patent No.: US 8,451,453 B2
(45) Date of Patent: *May 28, 2013

(54) DYNAMIC SENSOR OF PHYSICAL QUANTITIES WITH OPTICAL WAVEGUIDE WITH OPTICALLY PUMPED AMPLIFIER MEDIUM

(75) Inventors: Stéphanie Molin, Draveil (FR); Daniel Dolfi, Orsay (FR); Jean-Pierre Huignard, Paris (FR); Martine Doisy, Plascassier (FR)

(73) Assignee: Thales, Neuilly sur Seine (FR)

( * ) Notice: Subject to any disclaimer, the term of this patent is extended or adjusted under 35 U.S.C. 154(b) by 387 days.

This patent is subject to a terminal disclaimer.

(21) Appl. No.: 12/526,428

(22) PCT Filed: Feb. 27, 2008

(86) PCT No.: PCT/EP2008/052393
§ 371 (c)(1),
(2), (4) Date: Sep. 25, 2009

(87) PCT Pub. No.: WO2008/107355
PCT Pub. Date: Sep. 12, 2008

(65) Prior Publication Data
US 2010/0039650 A1 Feb. 18, 2010

(30) Foreign Application Priority Data
Feb. 28, 2007 (FR) ...................................... 07 01454

(51) Int. Cl.
*G01B 9/02* (2006.01)
(52) U.S. Cl.
USPC ........................................................ 356/480
(58) Field of Classification Search
USPC ................................ 356/477–482; 385/12, 13
See application file for complete search history.

(56) References Cited

U.S. PATENT DOCUMENTS 5,564,832 A * 10/1996 Ball et al. ...................... 374/161
8,290,316 B2 * 10/2012 Molin et al. ................... 385/12

FOREIGN PATENT DOCUMENTS

WO WO 99/28713 A1 6/1999

OTHER PUBLICATIONS

D.J. Hill et al., "A Fiber Laser Hydrophone Array", Part of the SPIE Conference on Fiber Optic Sensor Technology and Applications, Sep. 1999, pp. 55-66, vol. 3860, SPIE, Boston, MA.
Baruch Fischer et al., "Nonlinear Wave Mixing and Induced Gratings in Erbium-Doped Fiber Amplifiers", Optic Letters, Dec. 15, 1993, pp. 2108-2110, vol. 18, No. 24, Optical Society of America, Washington, D.C.
P.E. Bagnoli et al., "Development of an Erbium-Doped Fibre Laser as a Deep-Sea Hydrophone", Journal of Optic, A Pure an Applied Optics Jul. 1, 2006, pp. S535-S539, vol. 8, No. 7, Institute of Physics Publishing, Bristol, GB.
Alan D. Kersey et al., "Fiber Grating Sensors", Journal of Lightwave Technology, Aug. 1997, pp. 1442-1462, vol. 15, No. 8, IEEE, New York, NY.

* cited by examiner

Primary Examiner — Hwa Lee
(74) Attorney, Agent, or Firm — Baker & Hostetler, LLP

(57) ABSTRACT

The subject of the present invention is a dynamic sensor of physical quantities with optical waveguide with optically-pumped amplifier medium, which requires no interferometer or reference sensor and which makes it possible to obtain at least the same level of performance, in terms of sensitivity, as known sensors of this type, and this waveguide is linked at one end to a selective mirror, and comprises at its other end an interrogation laser, the reflection of which on the selective mirror produces a wave which, by interference with the incident wave, provokes the periodic saturation of the gain of the waveguide.

10 Claims, 3 Drawing Sheets a) Creation of the population inversion b) Modulation of the gain by two coherent optical waves c) Diffraction of the waves on the gain grating

DYNAMIC SENSOR OF PHYSICAL QUANTITIES WITH OPTICAL WAVEGUIDE WITH OPTICALLY PUMPED AMPLIFIER MEDIUM

BACKGROUND OF THE INVENTION

1. Field of the Invention

The present invention relates to a dynamic optical fiber, sensor of physical quantities, that is to say, one that is insensitive to static quantities, notably to the static quantities relating to the physical quantity to be measured.

2. Description of Related Art

One possible application of such sensors is a fiber-optic hydrophone. The most efficient existing systems rely on the use of distributed feedback fiber lasers, and they are used in complex architectures that implement interferometric interrogation devices.

The two main defects are:
  the high sensitivity of these sensors to static pressure and to temperature,
  the complexity of the interrogation systems.

The optical fiber-based sensors have been researched for close on thirty years. These sensors benefit from the advantages of optical fibers which, in addition to their low weights, bulk, cost and insensitivity to electromagnetic disturbances, exhibit low losses, a high bandwidth and are suited to the multiplexing techniques and to the implementation of amplifiers or distributed sensors.

The applications of optical fiber sensors are wide-ranging. The commonest relate to the detection of stresses, of temperature and of pressure, but they also exist as current/voltage, magnetic field, displacement, torsion, acceleration, gas and other detectors. The techniques used are also very varied, the most actively researched being fiber gyroscopes, other interferometric methods, and back scattering (Raman, Brillouin or Rayleigh) techniques. Almost half of the fiber sensors currently being researched implement Bragg gratings. In particular, the use of active sensors (lasers) based on Bragg gratings is becoming widespread: these are DBR (Distributed Bragg Reflector) lasers or DFB (Distributed FeedBack) lasers, the spectral purity of which provides for a high gain in terms of sensitivity compared to devices with passive Bragg gratings.

In the case of hydrophones with Bragg grating fiber, the quantity actually measured by the system is the axial deformation of the element with Bragg grating fiber induced by the pressure wave. For applications relating to hydrophones for submarine detection, the low pressure level that is to be detected ("sea 0" noise level according to the Knudsen scale) generally requires a mechanical device around this fiber element that is designed to amplify the transfer function between the external pressure and the axial deformation of the fiber. The order of magnitude of the deformations to be measured in this case is situated between $10^{-9}$ (nanostrain) and $10^{-12}$ (picostrain). The deformation on the sensor induces a phase shift on the optical wave that is propagated therein, which is reflected in the case of an active cavity with Bragg grating (DFB or DBR laser) in a variation of the optical frequency of the laser. Measuring this phase shift or this frequency variation entails comparing the frequency of the wanted signal with that of a reference signal. Among the methods used, there are primarily two solutions for obtaining a reference wave. The first solution (heterodyne type) consists in using a reference wave originating from a third-party sensor, similar but isolated from the disturbance. The second solution ("self-homodyne" type) consists in splitting the wanted signal into two arms with very different optical paths and in producing interferences between these two arms. In this case, the reference wave is a delayed copy of the signal wave.

One of the limitations of the current fiber laser hydrophones is the influence of the static pressure on the laser operation: under the pressure of the water either the cavities no longer emit, or their emission wavelengths are modified to the point of corrupting the operation of the system. In practice, the pressure of the water increases by approximately 1 bar every 10 m. However, these systems are intended for deep-immersion uses, that is to say, at depths of the order of 100 to 800 m. The static pressure modifies the length of the laser cavity and provokes a translation of the emission wavelength that is all the greater as the sensor is designed to be sensitive to very low dynamic pressure levels (approximately 3 nm to 400 m of depth in the case of a hydrophone optimized for submarine detection). In the case of wavelength multiplexed architectures, for example, the static pressure is a direct limitation of the spacing between two wavelengths, and consequently reduces the maximum number of sensors that can be arranged in series on a single fiber. There are solutions available for overcoming this problem. It is possible either to measure the static pressure, then take account of it when processing the data, or to compensate for it. The first method is expensive and limits the sensitivity of the system. The second method requires sophisticated mechanical and/or piezoelectric devices to filter, at the level of the mechanical deformation amplification device, the very low frequency portion.

SUMMARY OF THE INVENTION

One object of the present invention is a sensor of physical quantities with optical fiber that is intrinsically insensitive to the static deformations of the optical fiber, without requiring any interferometer or reference sensor, making it possible to obtain at least the same level of performance, in terms of sensitivity, as the known sensors of this type, and in particular the known hydrophones, while simplifying notably the interrogation system. It will be noted that these known hydrophones are, for example, Australian or Swedish DFB fiber laser-based hydrophones.

The sensor according to the invention is a sensor of physical quantities with optical waveguide with optically-pumped amplifier medium, and it is characterized in that this waveguide is linked at one end to a selective mirror and that it comprises at its other end an interrogation laser, the reflection of which on the selective mirror produces a wave which, by interference with the incident wave, provokes the periodic saturation of the gain of the guide.

The dynamic distributed feedback laser sensor according to the invention is intrinsically insensitive to static pressure. The Bragg grating is not previously photo-inscribed in the fiber, but on the contrary inscribed dynamically by the probe wave, by implementing a nonlinear optical effect that is simple and well known in itself: two-wave mixing by gain saturation. In this case, whatever the physical length of the cavity, the probe wave inscribes a gain grating, the pitch of which is perfectly suited to its natural diffraction. Such an active sensor, interrogated by a probe wave, is one solution for doing away with interferometric benches or additional sensors. The stress measurement is directly obtained by beating between the laser wave and the probe wave, without the need for any interferometer or reference sensor.

The inventive solution relies on the use of a dynamic distributed feedback fiber laser. This sensor is insensitive to static pressure and requires no interferometers to be implemented. The other advantages are the ease of implementation and of production (no photo-inscribed Bragg grating).

BRIEF DESCRIPTION OF THE DRAWINGS

The present invention will be better understood from reading the detailed description of an embodiment, taken by way of non-limiting example and illustrated by the appended drawing, in which.

DETAILED DESCRIPTION OF THE INVENTION

The inventive sensor mainly comprises a dynamic DFB fiber laser component interrogated by a probe laser wave. The guides that form this laser can be monorefringent or birefringent.

The inventive sensor is described hereinbelow with reference to optical fibers or optical waveguides that constitute its component that is sensitive to pressures that act on its optical properties by exerting an axial deformation on these fibers or guides, but obviously, any other physical quantity capable of provoking an axial deformation (for example, the use of a magnetorestrictive cladding transforms this sensor into a magnetometer . . . ) of these fibers or guides can be measured by this sensor.

Figure 1:
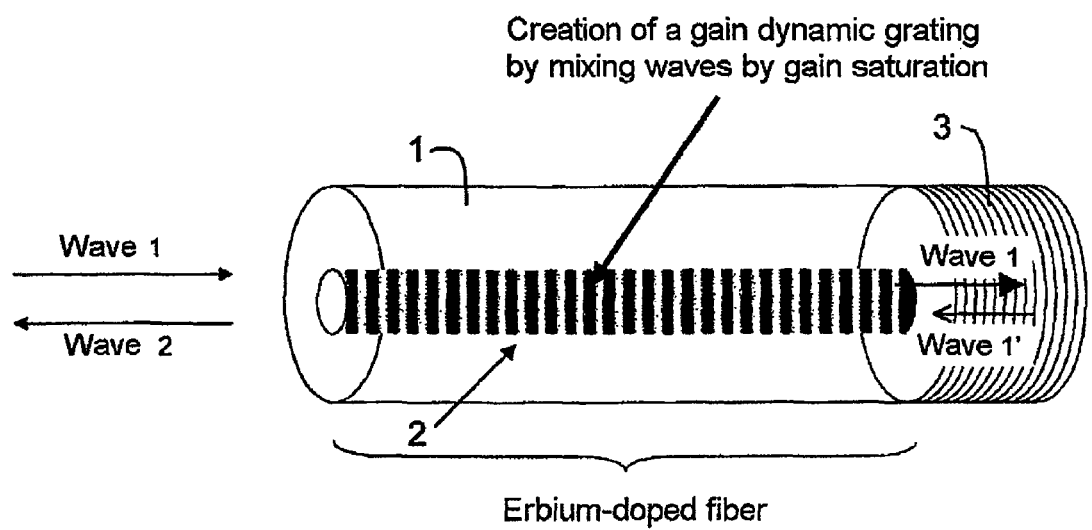
FIG. 1 is a cross-sectional diagrammatic view of a distributed feedback optical fiber sensor according to the invention.

As illustrated by FIG. 1, the inventive dynamic DFB sensor comprises a gain medium that is a section of amplifying fiber 1, in which is provoked a two-wave mixing 2, the section 1 being followed by a short Bragg mirror 3 that is therefore relatively selective. The two waves interfering in the gain medium are the wave "wave 1" at the frequency $v_1$ and the wave "wave 1'", which is obtained by reflection of the wave 1 on the mirror 3 which can be either a Bragg mirror or a dielectric mirror. The diffraction of the wave 1 on the newly created gain grating leads to the creation of the wave "wave 2".

Figure 2:
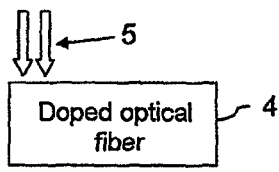
FIG. 2 is a diagram explaining the physical principle implemented by the present invention.
Figure 2:
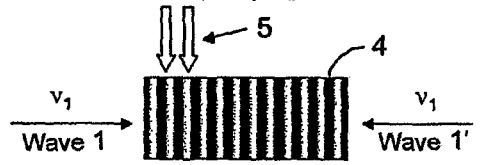
Figure 2:
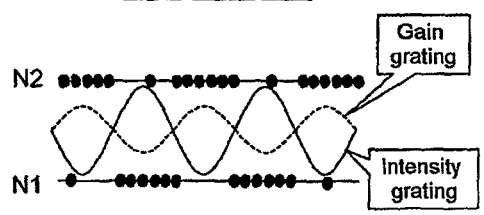
Figure 2:
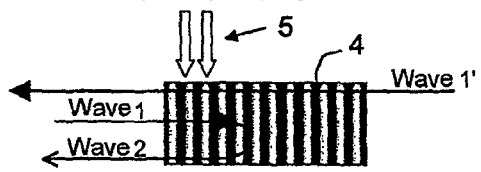

FIG. 2 details, in three steps denoted a, b and c, the physical process of two-wave mixing in an amplifying medium 4. The amplifying medium is therefore here an optical fiber that is previously doped and optically pumped (5) to achieve the population inversion between its energy levels, denoted N1 and N2 (step a). Let us consider (step b) two optical waves of the same frequency $$v_1 = \frac{c}{\lambda_1}$$

(where c and $\lambda_1$ respectively represent the speed of light and the wavelength in the vacuum), of the same polarization state, mutually coherent and of coherence length $L_{coh}$ at least equal to the length L of the fiber. These two waves (denoted wave 1 and wave 1') are injected into the amplifying medium in opposite directions and interfere therein. The result of this is a periodic spatial variation of the total intensity of the wave at the frequency $v_1$ in the medium, which leads to a periodic saturation (at the level of the bright fringes) of the gain in the amplifying medium. The gain and/or index grating generated in this way allows the diffraction and the coupling of the two waves that have been created. Thus (step c), the wave 1 is diffracted on the gain grating that it has inscribed by interference with the wave 1' to give a diffracted wave, wave 2, being propagated in the same direction as the wave 1'. The pitch of the gain grating is $$\Lambda = \frac{\lambda_1}{2n_e} = \frac{c}{2n_e v_1}$$

(where $n_e$ represents the effective index of the amplifying medium).

The life of the gain grating created in this way determines the bottom cut-off frequency of the sensor. In the conventional case where the dopant (rare earth) of the amplifying fiber is an erbium ion, the life of the excited state is of the order of 1 to 10 ms depending on the state of saturation of the medium. The inventive sensor then has a bottom cut-off frequency of the order of 100 Hz to 1 kHz. For the slow disturbances (phase variations of the incident wave, local temperature or static pressure variations), the grating is adapted automatically. For the higher-frequency disturbances (acoustic wave to be detected), the sensor behaves as a conventional fixed Bragg grating, the axial deformation of which modulates the reflectivity.

The offset $\Delta\lambda_B$ of the Bragg wavelength of such a sensor is:

$$\Delta\lambda_B = 2n_e \Lambda \varepsilon_z - 2n_e \Lambda \left[ \frac{n_e^2}{2}((p_{11} + p_{12})\varepsilon_r + p_{12}\varepsilon_z) \right]$$

in this equation:
$\in_z$ and $\in_r$ are the longitudinal and radial deformations ($\in_r = \in_z$ in the isotropic hypothesis)
$n_e$ is the actual refractive index of the fiber
$\Lambda = \lambda_B / 2n_e$ is the pitch of the Bragg grating
$p_{11}$ and $p_{12}$ are the transverse and longitudinal elasto-optical coefficients of the fiber.

This equation can be used to assess the sensitivity of the sensor: the offset in wavelength for an applied pressure of 1 Pa is of the order of $-3.6 \cdot 10^{-9}$ nm. (With, for silica, $n_e = 1.456$; $p_{11} = 0.121$; $p_{12} = 0.265$).

For this calculation, the deformation value is taken to be equal to $\in_z = -0.75 \cdot 10^{-15}$ and calculated as follows:
$\in_z = (2\theta - 1) P/E$ where E is the Young's modulus and $\theta$ the Poisson's coefficient (for silica $E = 72 \cdot 10^9$ Pa and $\theta = 0.23$).

The sensitivity of the hydrophone needs to allow the sea 0 (Knudsen scale) noise level, namely 100 µPa/√Hz to 1 kHz, or a deformation $\in_z = -0.75 \cdot 10^{-15}/(\text{root (Hz)})$ at 1 kHz on a bare optical fiber. Where a mechanical device surrounds the sensitive element of the fiber, it is known that it is possible to amplify this deformation by a factor of 30 to 60 dB and therefore bring the sea 0 noise level to be detected to a dynamic deformation level greater than the "picostrain". ($10^{-12}$).

It appears that this device can therefore be used as an axial deformation sensor in fiber-based hydrophone systems, with a sensitivity at least equal to that of the existing sensors, and with the advantages of insensitivity to static pressure and simplification of the interrogation architectures.

Figure 3:
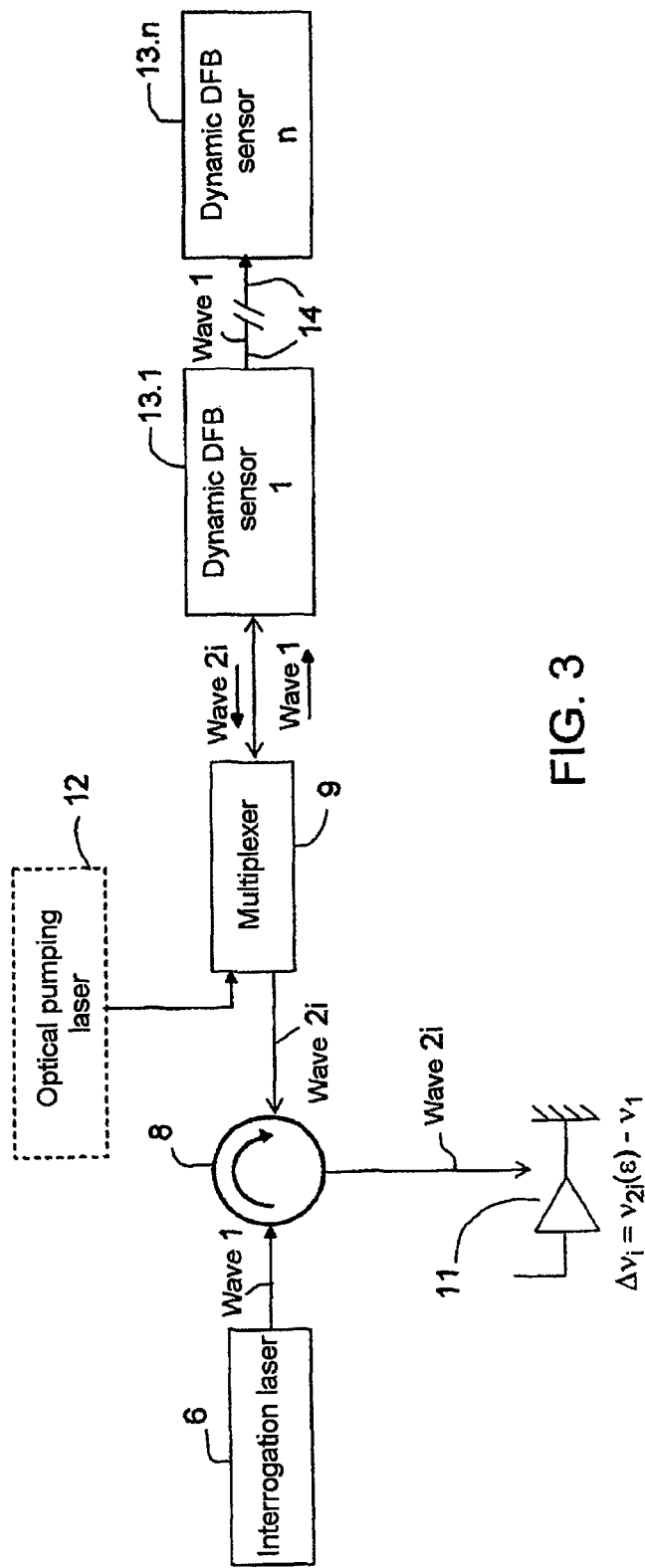
FIG. 3 is a block diagram of a hydrophone that uses a sensor according to the invention.

FIG. 3 illustrates an exemplary embodiment of a fiber-based hydrophone that is considerably simplified compared to the known hydrophones, and that mainly comprises: an interrogation laser 6, the beam of which is sent via a circulator 8 to the input of a wavelength multiplexer 9. This interrogation laser is either a laser emitting n wavelengths $\lambda_i$ or else a tunable laser capable of scanning the entire range of operating wavelengths of the n sensors. The output wave from the circulator (originating from the series of sensors), is sent to a detection diode 11. The energy of a 12 to 980 nm optical pumping laser diode for example is injected via the multiplexer 9, to the sensor or sensors (n sensors referenced 13.1 to 13.n) placed in series on an optical fiber 14, in order to produce the population inversion. The signal obtained from the sensor i and denoted by its optical frequency $v_{2i}$ is propagated (in this example) in the direction opposite to that of the pump 12. The wave of optical frequency $v_{2i}$ meets with the probe wave of optical frequency $v_{1i}$ obtained from the reflection of the interrogating laser 6 directly onto the fixed cavity-bottom mirror of the sensor. After passing through the multiplexer and the circulator, the two optical frequencies $v_{1i}$ and $v_{2i}(\in)$ give rise to a beating on the detector 11 at the frequency $\Delta v_i(\in) = v_{1i} - v_{2i}(\in)$. The value of $\Delta v_i$ depends on the stress $\in$ seen by the sensor i. Thus, in the case of a periodic modulation $\Delta \Phi$ of the phase of the dynamic DFB grating, $\Delta \Phi = \Delta \Phi_i \cos(\Omega t)$, this results, by return, in a wave diffracted by the dynamic DFB of which the amplitude of the field is expressed by:

$$\xi_{2i} = \xi_{1i} \exp(j\omega_i t) \exp(\Delta \Phi_i \cos(\Omega t))$$

The frequency $v_{2i}$ of the wave $2i$ is, in these conditions:

$$v_{2i} = v_{1i} + \frac{1}{2\pi} \frac{\partial \Delta \Phi}{\partial t} = v_{1i} - \Delta \Phi_i \Omega \sin(\Omega t),$$

which corresponds to a modulation signal after detection by beating with the frequency $v_i$ of the signal at the frequency $\Omega$. Whatever the nature of the cavity-bottom mirror of the sensors (Bragg or dielectric), its reflection spectral width $\Delta \lambda_i$ must be sufficient to ensure the reflection at $\lambda_i$ in the conditions of use of the sensor (taking into account temperature, pressure and other stresses). Note that in certain cases (dependent on the position of the operating wavelength of the sensor relative to the resonance wavelength of the amplifying medium), a spatial modulation of the index is superimposed on the spatial modulation of the gain and can help to reinforce the phase modulation effect due to the acoustic wave.

Figure 4:
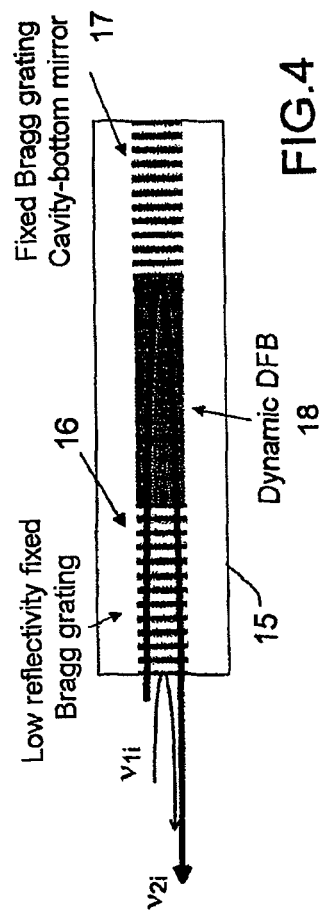
FIG. 4 is a diagram of a variant of the sensor of FIG. 1, provided with a partially-reflecting input mirror.

A variant of the inventive sensor described hereinabove is represented in FIG. 4. In this sensor 15, the incident wave is partially reflected by a low-reflectivity Bragg grating 16 formed at one of the ends of the sensor 15, this end being the end that both receives the interrogation wave (wave 1) and by which the output wave leaves the sensor (wave 2). Another fixed Bragg grating 17 with high reflectivity is formed at the other end of the sensor 15. As in the case of the sensors described hereinabove, a dynamic DFB 18 is formed in the sensor 15 between the two fixed Bragg gratings. The detector then receives the beating between the reflection of the wave 1 on the mirror 16 and the wave 2. Note that, according to the principles of FIGS. 2 and 4, the detected signal is not affected by the source/sensor distance variations, nor by the hydrostatic pressure.

The invention has been described hereinabove with reference to an example that uses an erbium-doped amplifying fiber. Note that this fiber can be replaced by any other type of amplifying fiber. In practice, the two-wave mixing to produce a dynamic DFB sensor can be envisaged, more generally, within any fiber doped by rare earth ions. Such fibers are found in commerce, they are ytterbium-, neodyme-, samarium- or thulium-doped or even erbium-ytterbium, thulium-holmium or erbium-ytterbium co-doped. Obviously, the absorption wavelengths (determining those of the optical pumping) and laser emission wavelengths vary according to the amplifier used. In addition, the concentration of the dopant used determines the shape and the width of the gain profile of the amplifier. Thus, for example, an erbium-doped fiber is often more precisely Ge/SiO$_2$:Er-doped, but an Al/P/SiO$_2$:Er doping can be used to obtain a gain spectrum that becomes wider and flatter as the aluminum concentration rises.

In the exemplary embodiment described hereinabove, the optical pumping is performed by a 980 nm laser diode. Other pumping lasers would be used in the case of doping of the amplifying fiber by a non-erbium rare earth ion. Note that, even in the case of an erbium-doped fiber, it is possible to consider using other absorption transitions (around 810 nm or 1480 nm). However 980 nm and 1480 nm are the two wavelengths that are best suited: semiconductor laser diodes are available at these wavelengths (in AlGaAs for 980 nm and in InGaAsP for 1480 nm). Moreover, the properties of the erbium-doped fiber amplifiers can be transposed to the case of the present invention: a pumping at 980 nm allows for an almost total population inversion and an optimum signal-to-noise ratio, whereas a pumping at 1480 nm allows for higher pumping and saturation powers (therefore greater gain) and a longer-distance offset (distances of the order of 10 km to 50 km can be envisaged) because the absorption losses of the conventional fibers are reduced.

According to another variant of the invention, the two-wave mixing is produced by gain saturation, not in an amplifying fiber, but in an amplifying waveguide (EDWA, for example, standing for Erbium-Doped Waveguide Amplifier). The principle of the sensor remains absolutely identical, that is to say that it is also the seat of a dynamic gain grating by wave mixing and saturation of its gain.

The example of FIG. 3 shows a multi-sensor architecture where the sensors are mounted in series and wavelength multiplexed. This type of sensor in series can also be interrogated by time-demultiplexing methods, or even by hybrid TDW/WDM methods (time and wavelength demultiplexing).

The invention claimed is:
1. A dynamic sensor of physical quantities comprising:
an optical waveguide including an amplifier medium;
a pumping laser configured to provide a pumping light along an optical waveguide to optically pump the amplifier medium;
at least one selective mirror linked to a first end of the optical waveguide;
an interrogation laser linked to a second end of the optical waveguide configured to generate an incident wave at a predetermined first wavelength in the optical waveguide towards the at least one selective mirror;
wherein the at least one selective mirror is configured to reflect a wave at the first wavelength to produce a reflective wave reflected by the at least one selective mirror toward the second end having a wavelength that equals to the first wavelength, wherein the reflective wave interferes with the incident wave between the at least one selective mirror and the second end and provoking a periodic saturation of a gain of the optical waveguide between the at least one selective mirror and the second end.
2. The dynamic sensor as claimed in claim 1, wherein the optical waveguide is an optical fiber doped by rare earth ions.
3. The dynamic sensor as claimed in claim 1, wherein the optical waveguide is an EDWA amplifier guide.

4. The dynamic sensor as claimed in claim 1, wherein the at least one selective mirror comprises a plurality of the selective mirrors arranged in series.

5. The dynamic sensor as claimed in claim 1, wherein the optical waveguide is configured to permit the interference between the reflective wave and the incident wave from the first end to the second end.

6. The dynamic sensor as claimed in claim 1, further comprising
- a circulator, wherein the incident wave is transmitted to the optical waveguide via the circulator; and
- a detector for receiving, via the circulator, a beating between the reflective wave and a resulting wave produced by the second end of the optical waveguide in a same direction as the reflective wave.

7. The dynamic sensor as claimed in claim 1, wherein the optical waveguide is an amplifier guide.

8. The dynamic sensor as claimed in claim 1, wherein the optical waveguide is monorefringent.

9. The dynamic sensor as claimed in claim 1, wherein the optical waveguide is birefringent.

10. The dynamic sensor as claimed in claim 1, wherein the dynamic sensor is an hydrophone.

\* \* \* \* \*